United States Patent
Zheng et al.

(10) Patent No.: US 7,975,243 B2
(45) Date of Patent: Jul. 5, 2011

(54) SYSTEM AND METHOD FOR TELEVISION CONTROL USING HAND GESTURES

(75) Inventors: Xing Zheng, Irvine, CA (US); Dang Van Tran, Laguna Niguel, CA (US); Sun H Ahn, Ladera Ranch, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 702 days.

(21) Appl. No.: 12/037,033

(22) Filed: Feb. 25, 2008

(65) Prior Publication Data

US 2009/0217210 A1    Aug. 27, 2009

(51) Int. Cl.
*G06F 9/1445* (2006.01)
*G09G 5/00* (2006.01)

(52) U.S. Cl. ........ 715/863; 715/864; 715/865; 715/866; 715/867; 715/200; 345/104; 345/105

(58) Field of Classification Search .......... 715/200–277, 715/700–867; 700/701–866; 709/201–229; 705/50–79; 345/30–111, 173; 707/1–10, 707/100–104.1, 200–206; 382/103, 118; 463/26; 438/266, 588
See application file for complete search history.

(56) References Cited

U.S. PATENT DOCUMENTS

| | | | |
|---|---|---|---|
| 5,594,469 A | | 1/1997 | Freeman et al. |
| 5,963,190 A | * | 10/1999 | Tsuboyama et al. .......... 345/103 |
| 6,118,888 A | * | 9/2000 | Chino et al. .................. 382/118 |
| 6,345,111 B1 | * | 2/2002 | Yamaguchi et al. .......... 382/118 |
| 2006/0013440 A1 | * | 1/2006 | Cohen et al. .................. 382/103 |
| 2008/0174570 A1 | * | 7/2008 | Jobs et al. ..................... 345/173 |
| 2009/0093300 A1 | * | 4/2009 | Lutnick et al. ................. 463/26 |
| 2009/0286370 A1 | * | 11/2009 | Harari et al. .................. 438/266 |
| 2010/0281432 A1 | * | 11/2010 | Geisner et al. ................ 715/849 |

* cited by examiner

*Primary Examiner* — Ruay L Ho
(74) *Attorney, Agent, or Firm* — Beyer Law Group LLP

(57) ABSTRACT

Systems and method which allow for control of televisions and other media device are disclosed. A television set is provided with a gesture capture device configured to receive a gesture input directed to at least one of a plurality of predefined areas related to the television set. The television set further includes a user interaction interface configured to generate data indicative of the gesture input directed toward the at least one of the predefined areas and control the television based at least in part on the generated data.

38 Claims, 12 Drawing Sheets

SYSTEM AND METHOD FOR TELEVISION CONTROL USING HAND GESTURES

BACKGROUND OF THE INVENTION

1. Field of the Invention

This application relates to controlling televisions and other media devices using gestures.

2. Description of Related Technology

Initially, televisions were controlled using predefined function buttons located on the television itself. Wireless remote controls were then developed to allow users to access functionality of the television without needing to be within physical reach of the television. However, as televisions have become more feature-rich, the number of buttons on remote controls has increased correspondingly. As a result, users have been required to remember, search, and use a large number of buttons in order to access the full functionality of the device. More recently, the use of hand gestures has been proposed to control virtual cursors and widgets in computer displays. These approaches suffer from problems of user unfriendliness and computational overhead requirements.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In a first aspect, a television set is provided which includes a gesture capture device configured to receive a gesture input directed to at least one of a plurality of predefined areas related to the television set. The television set further includes a user interaction interface configured to generate data indicative of the gesture input directed toward the at least one of the predefined areas and control the television based at least in part on the generated data.

In a second aspect, a method of providing user control of a media device is provided. The method includes receiving a gesture input directed toward at least one of a plurality of predefined areas related to the device and generating data indicative of the gesture, wherein the data indicative of the gesture comprises a gesture identifier. The media device is controlled based at least in part on the generated data.

In yet another aspect, a media device having machine-executable instructions stored thereon, which when executed by a processor, perform a method of providing user control of the media device is provided. The method includes receiving a gesture input directed to at least one of a plurality of predefined areas related to the device and generating data indicative of a gesture directed toward the at least one of the predefined areas. The media device is controlled based at least in part on the generated data.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments disclosed herein allow users to control media display devices using hand gestures. In many of the embodiments described below, the media display device takes the form of a television. The television screen may be divided into four regions (e.g., quadrants) which allow users to apply multiple distinctive hand gestures in order to interact with the television. The different hand gestures are generally divided into two different gesture categories: a "push" and a "move." The push gesture is generated by a user directing a push toward one or two of the four regions of the television screen. The move gesture is generated by a user pushing one region and then moving their hand(s) to other regions. When the gestures are detected by the television they cause the television to perform a predefined action. In addition, the television may be configured to provide feedback to the user. The feedback may take the form of, for example, graphics on the television screen and/or LED lights on the exterior of the television which confirm inputs and guide additional user interaction. Although the examples described herein generally are provided in the context of television control, a skilled technologist will appreciate that other types of media display devices such as computer displays, digital video players, and other types of display devices may also be controlled utilizing the systems and methods described herein.

Figure 1:
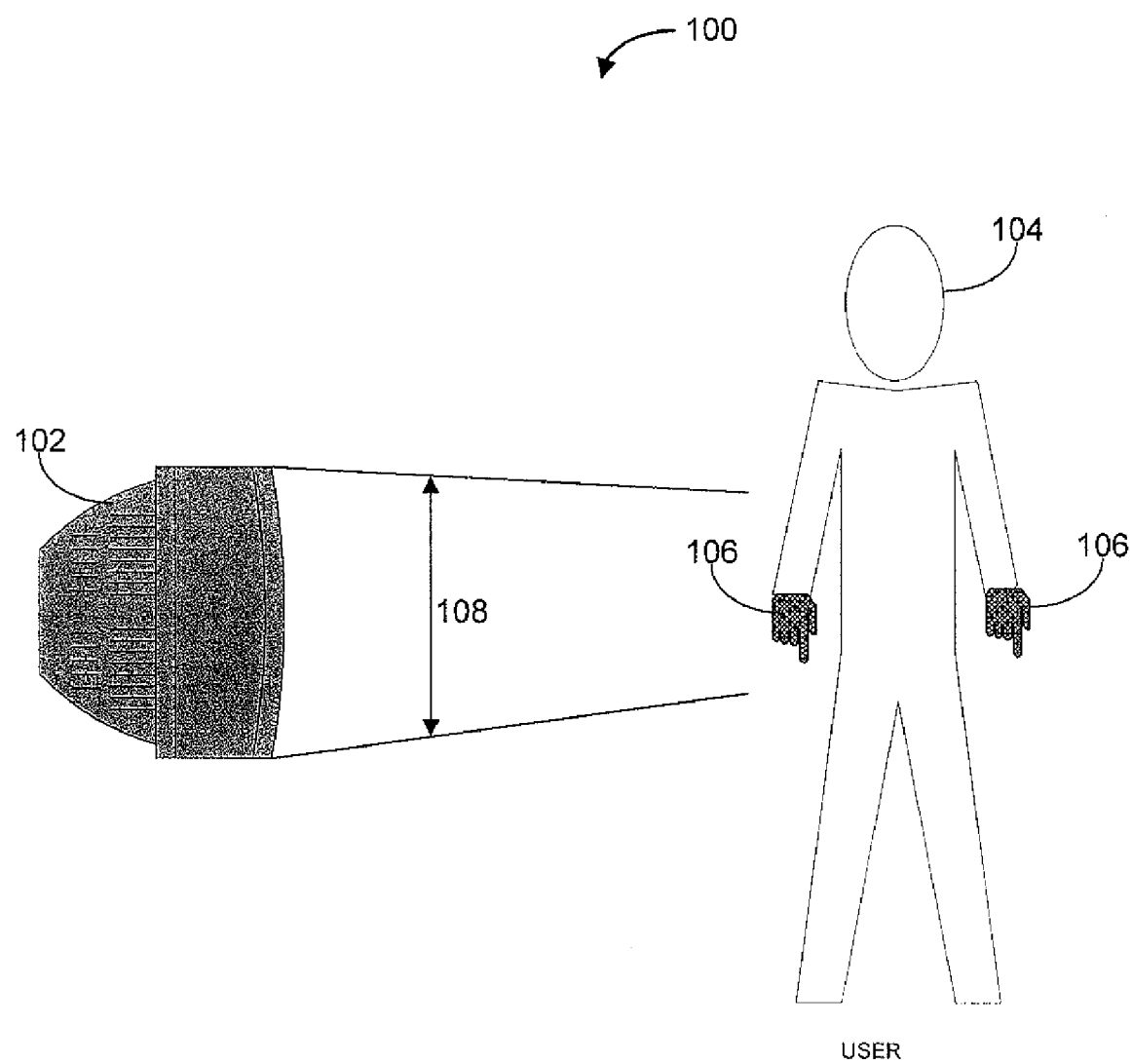
FIG. 1 is an example of an environment suitable for practicing various embodiments described herein.

FIG. 1 is one example of an environment 100 suitable for providing human-television interaction using the gesture-based techniques described herein. The interaction environment 100 typically includes a television 102 and a user 104. The television 102 and the user 104 may be relatively positioned in such a way as to provide a substantially unobstructed path 108 between at least some portion of the television 102 and the hands 106 of the user 104. As will be discussed in more detail in connection with FIGS. 2 and 3, the television 102 typically has a substantially unobstructed path to the hands 106 of the user 104 so that gesture capturing devices on the television are able to capture the movements of the hands 106.

Figure 2:
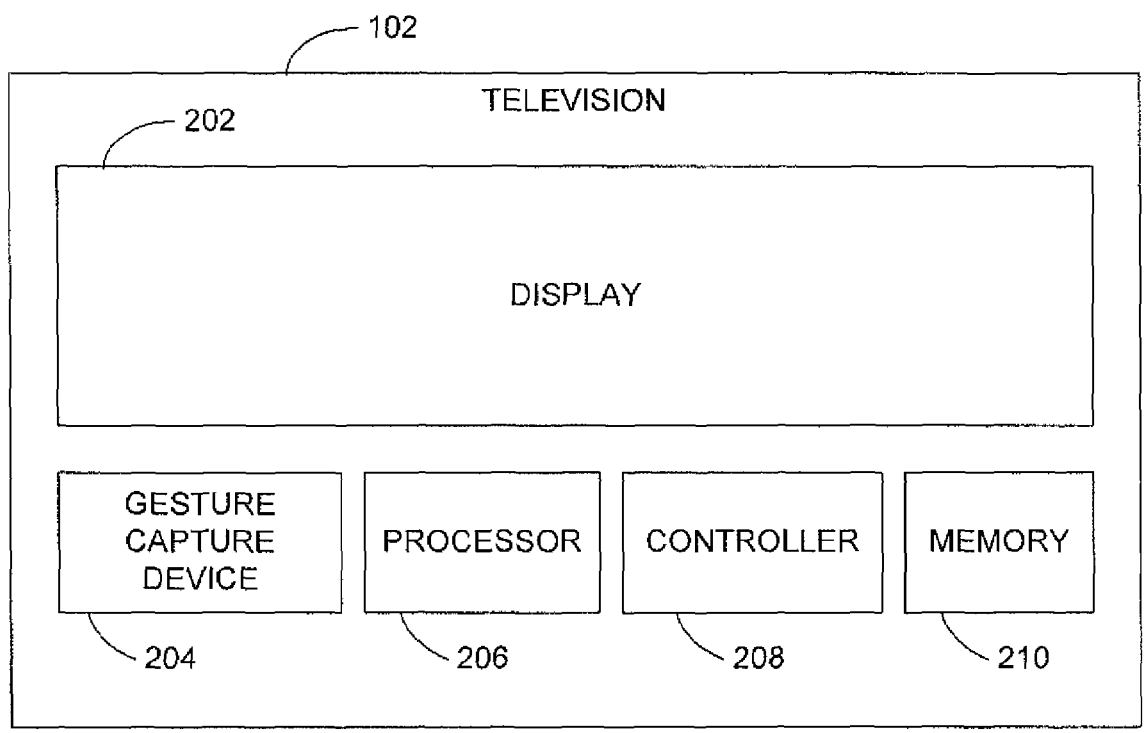
FIG. 2 is a block diagram of a television configured to receive gestures from a user in accordance with one or more embodiments.

FIG. 2 is a more detailed block diagram showing various components of the television 102. It should be appreciated that the block diagram is not intended to show all components of the television 102, but instead provides details about certain components which are typically used to practice various embodiments. The television 102 includes a display 202. The display may be a conventional CRT display, a LCD display, a plasma display, or some other type of television display. The display 202 may be divided into four different regions: upper right (UR), upper left (UL), lower right (LR) and lower left (LL). The television also includes a gesture capture device 204. The gesture capture device 204 may take various forms. In some embodiments, the gesture capture device 204 may be a video camera which captures the movements of the hands 106 of the user 104. Alternatively, the gesture capture device 204 may take the form of one or more motion sensors which detect movement of the hands 106.

The television 102 may also include a processor 206. The processor 206 may be any of various types of processors. The processor 206 may be a central processing unit (CPU). Other types of processors 206 may also be used. The television 102 may further include a controller 208. The controller 208 generally receives data from the processor 206 or some other internal device components. The controller 208 may be configured to reformat the received data into a format suitable for scanning across the display 202. In some embodiments, the controller 208 may be associated with the processor 206 as a stand-alone Integrated Circuit (IC). However, the controller 208 may be implemented in various ways. For example, the controller may be embedded in the processor 206 as hardware, embedded in the processor 206 as software, or fully integrated in hardware with the display 202 itself.

Also included in the display device is a memory 210. The memory 210 may also take various forms. In one embodiment, the memory 210 may be dedicated onboard memory that is included with one or both of the processor 206 and the controller 208. Alternatively, the memory 210 may be general purpose memory that is shared with other hardware and software included in the device. The memory 210 may be some form of random access memory (RAM) such as DRAM, SRAM, VRAM, SDRAM or the like, or it may some other form of memory such as flash memory, for example, which may be used to store data.

Although the illustrative television 102 has been described with reference to a particular configuration in FIG. 2, a skilled technologist will readily appreciate that the television 102 may take many forms and configurations. Moreover, the television 102 may include various other system components not described herein which provide other features generally applicable to the television 102.

Figure 3A:
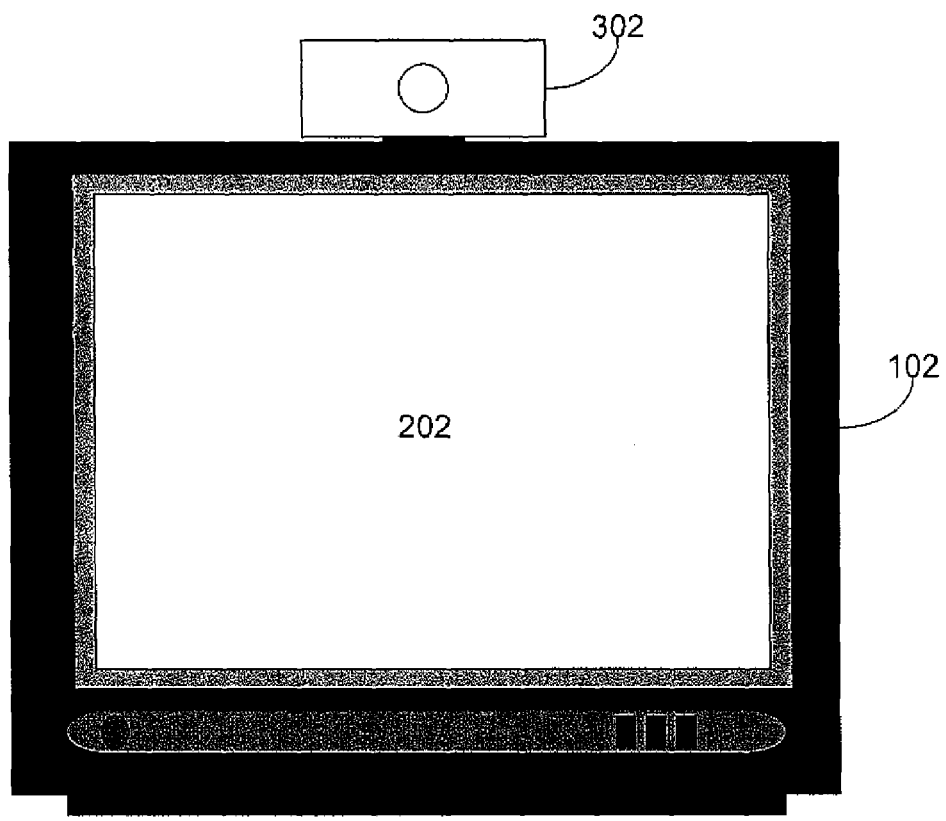
FIGS. 3A and 3B are examples of televisions equipped with gesture-capture devices in accordance with one or more embodiments.

FIG. 3A is an example of a television 102 with a camera-based gesture capture device. As shown in the figure, television 102 includes a camera 302 which is positioned in such a way that it faces the same general direction as the display 202. The camera 302 need not be a particularly sophisticated camera device, and may have resolution capabilities roughly similar to a "webcam" as is well-known in the computer field. Of course, more sophisticated and technologically advanced cameras may also be used. The camera 302 typically has an operating range in which gestures may be captured from the hands 106 of the user 104. In some embodiments, the camera may be configured to detect and process gestures directed at specific locations relative to the television 102. In one specific example, the camera 302 may be configured to detect gestures directed toward one or more predefined quadrants areas of the television display 202.

Figure 3B:
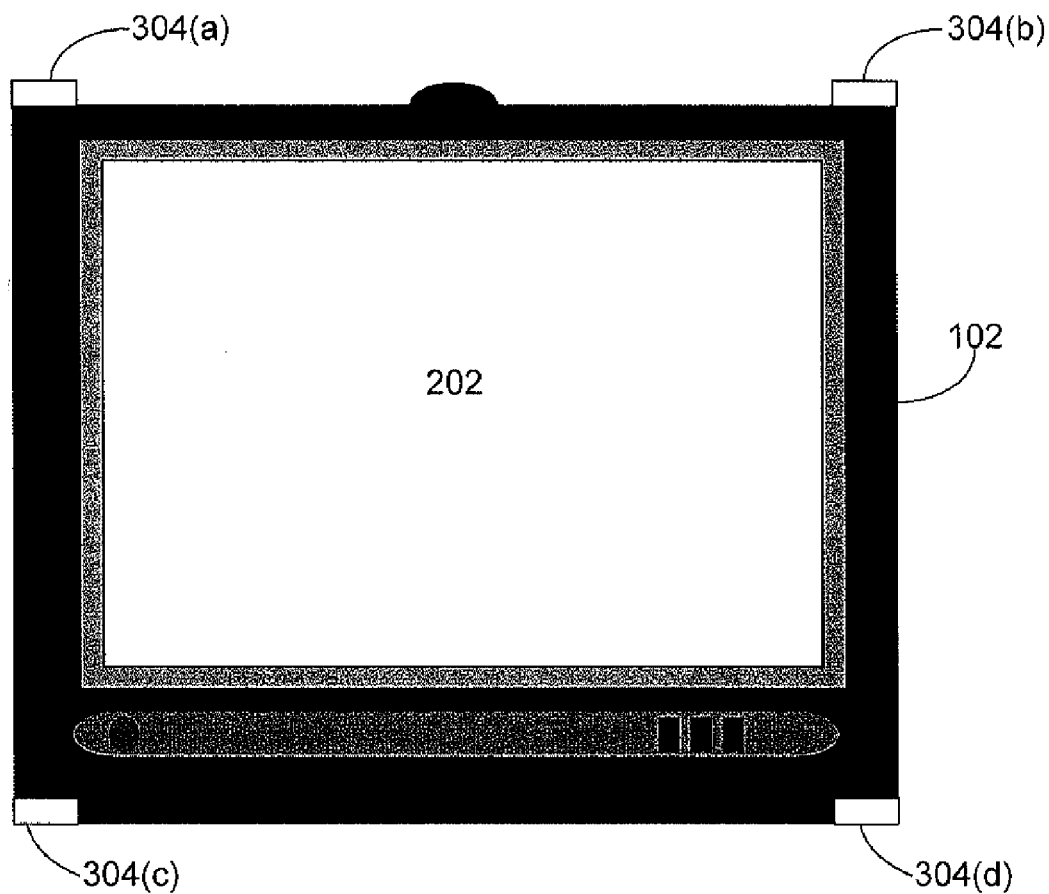

FIG. 3B is an example of a television 102 which utilizes sensors 304 as its gesture capture device 204. The sensors 304 may be motion detection sensors positioned on the exterior of the television 102. In some embodiments, the sensors 304 are positioned near each of the four corners of the television display 202 to receive gestures directed to that specific area on the television display 202. For example, the sensor 304(*a*) may detect and receive hand gestures from the user 104 directed to the upper left corner (from the standpoint of the user 106) of the television device, while sensor 304(*b*) may detect and receive hand gestures from hands 106 of the user 104 that are directed to the upper right corner of the display 202. Similarly, the sensors 304(*c*) and 304(*d*) may receive input from the hands 106 of the user 104 which are directed to the lower left and lower right portions of the display 202, respectively. Although specific exemplary gesture capturing configurations has been shown in FIGS. 3A and 3B, a skilled technologist will appreciate that other types of configurations may be used to receive and process gestures input by the user 106. For example, the television 102 may include both a camera 302 and sensors 304, or it may include some other type of gesture capture device 204.

Figure 4:
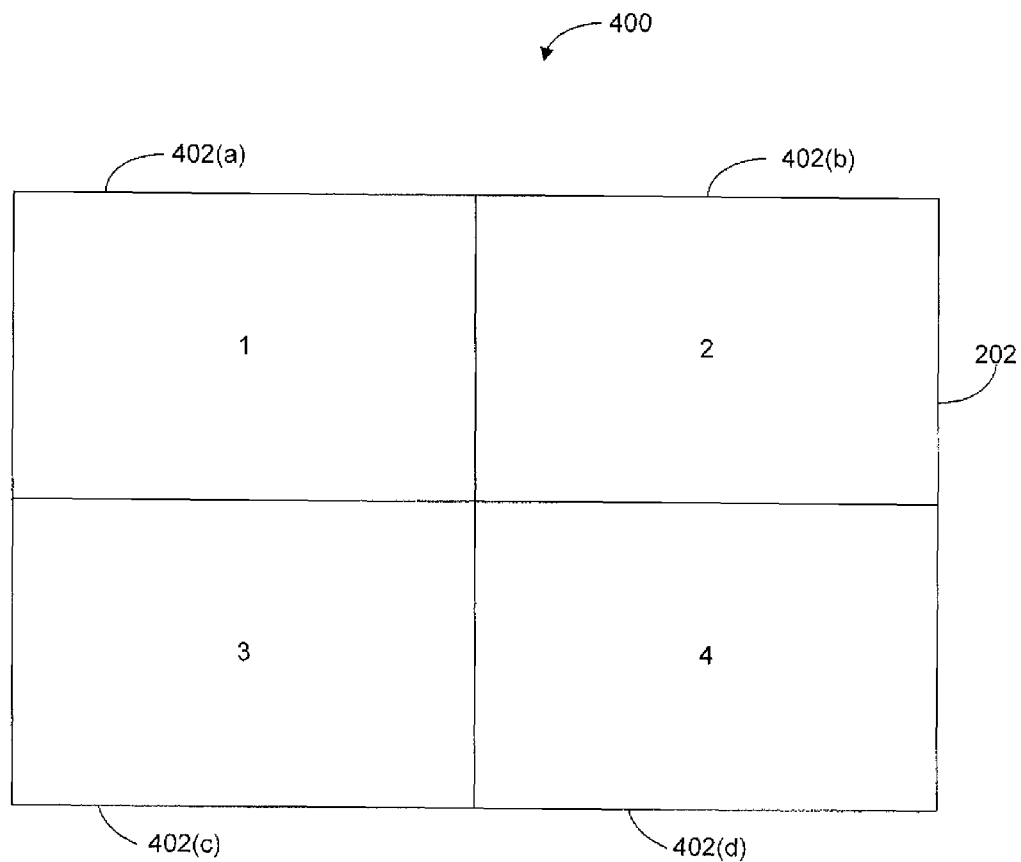
FIG. 4 is an example of a button user interface that may be used by an application to receive user input into the media device.

FIG. 4 is an example of a button user interface 400 which may be displayed on the display 202 of the television 102 to allow the user 104 to control its operation. The button user interface 400 typically divides the display 202 into four "virtual" buttons: upper left button 402(*a*), upper right button 402(*b*), lower left button 402(*c*), and lower right button 402(*d*). Each of the buttons 402(*a*)-402(*d*) may be pushed by the user 104 via gestures input received from their hands 106 and captured by the gesture capture device 104. In embodiments in which gesture sensors 304(*a*)-304(*d*) are used, inputs detected by and/or received into gesture sensors 304(*a*)-304(*d*) may correspond to buttons 402(*a*)-402(*d*) of the button user interface 400, respectively. For example, when the upper left gesture sensor 304(*a*) detects a hand gesture from a user 104, this movement corresponds to an action on the upper left button 402(*a*) of the button user interface 400.

As noted above, the gesture capture devices 204 may be configured to detect and/or receive gestures from the hands 106 of users 104. As will be discussed in further detail below, the gesture capture devices 204 may be configured to detect different types of gestures or movements of the hands 106. In some embodiments, there may be two broad categories of hand gestures—push gestures and move gestures. As used herein, a push gesture is the gesture made by the user 106 when he "pushes" his hands 106 toward the television, typically toward one or more of the four quadrants 402(*a*)-402(*d*). A move gesture is a gesture made by the user 104 when they move one or both of their hands 106 from one of the quadrants to another of the quadrants. More gestures will be discussed in further detail below in connection with FIG. 7.

Figure 5:
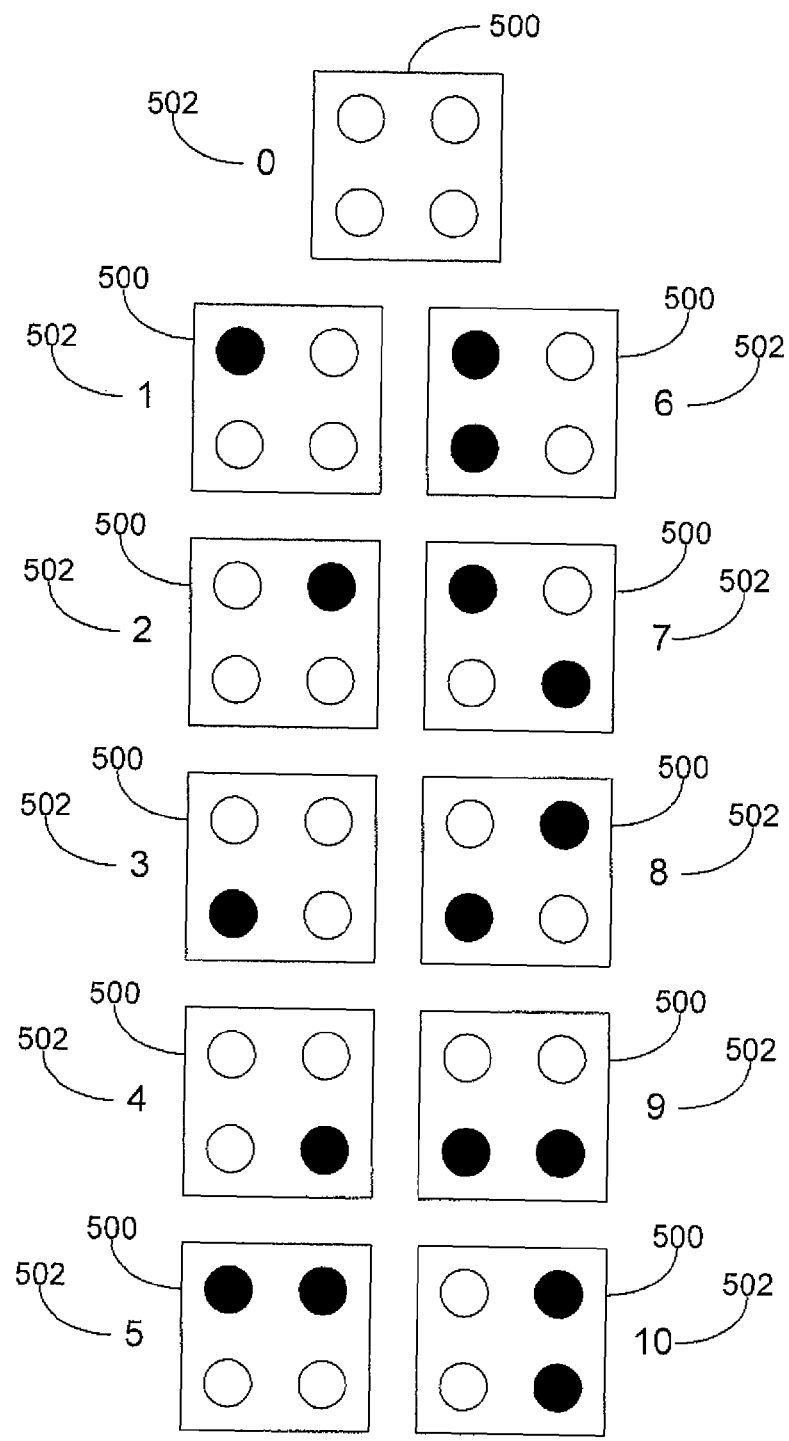
FIG. 5 is an example of push gestures which may be used to input data via the button user interface shown in FIG. 4.

Referring now to FIG. 5, an example of quadrant-based push gestures 500 and their associated gesture identifiers 502 is provided. As shown in FIG. 5, there are a total of eleven different push gestures which may be input by the user 104, and they are associated with gesture identifier values of 0 though 10. The push gestures are expressed as circles representing the state of each quadrant as being pushed or not pushed. For example, the push gesture 500 with the gesture identifier 502 having a value of "0" includes all non-pushed quadrants, as indicated by none of the circles having a darkened appearance. The push gesture 500 associated with the gesture identifier 502 having a value of "1" includes the upper left quadrant as being pushed (indicated by the darkened appearance of the circle). The remaining push gestures 500 and their associated gesture identifiers 502 may be similarly understood.

As noted above in connection with FIG. 4, one embodiment provides a button user interface 402 which divides the display 202 into four quadrants 402(*a*)-402(*d*). This button user interface 402 may be controlled using some or all of the push gestures shown in FIG. 5. For example, the upper left button 402(a) of the button interface 400 may be accessed using the push gesture 500 with the gesture identifiers 502 having a value of "1". This push gesture corresponds to a push of the upper left quadrant as captured by the gesture capture device 204. Similarly, the other buttons 402(b)-402(d) of the button user interface may be accessed by input of push gestures with identifiers 502 having values of "2" through "4" respectively.

It will be apparent to the skilled technologist that these eleven push gestures include each possible permutation of simultaneous pushes that may be input utilizing the two hands 106 of the user 104. As a result, although there could conceivably be sixteen different combinations of quadrant-based gestures, because a user 104 only has two hands 106, only two of the quadrants may receive a push at any given time. Accordingly, none of the push gestures shown in FIG. 5 include more than two pushed quadrants, and only eleven gestures are defined.

Figure 6:
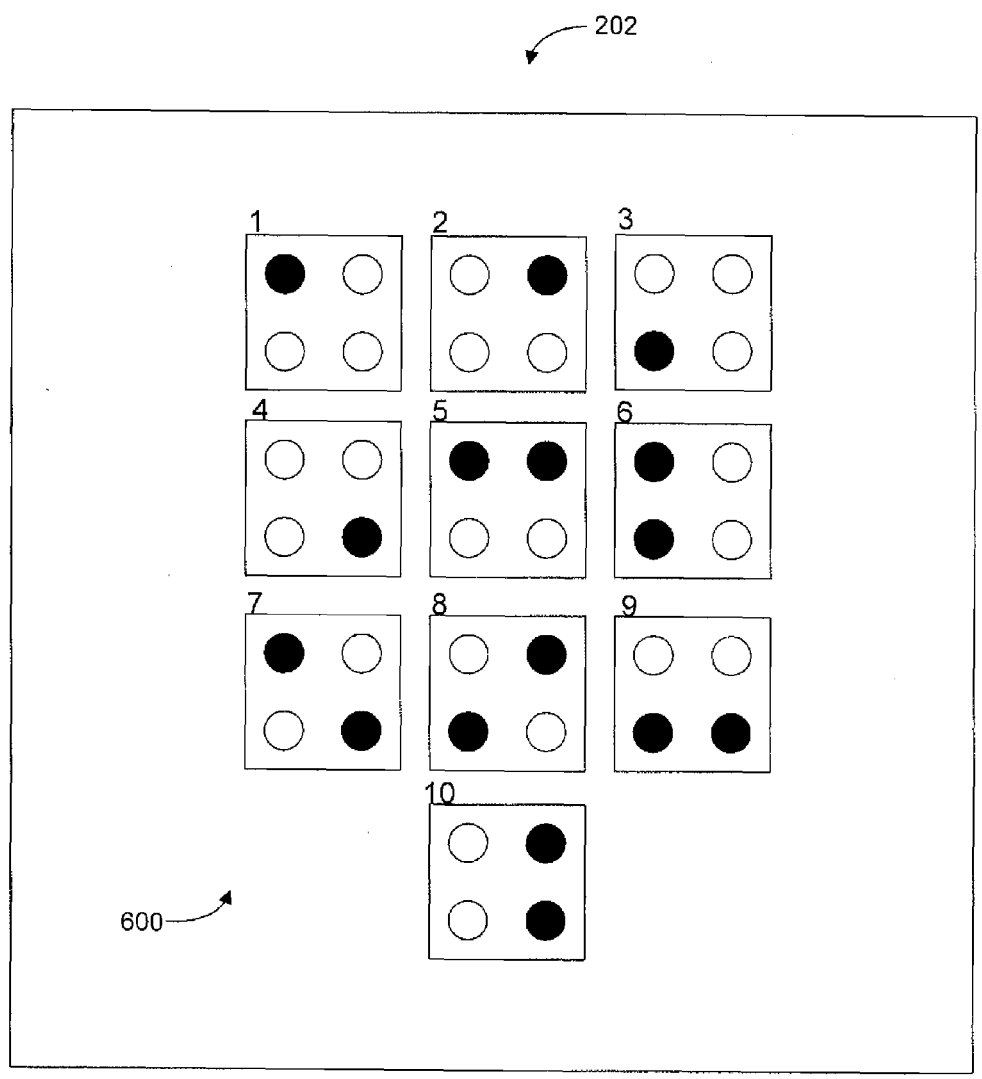
FIG. 6 is an example of a digit user interface mapping which may be controlled by the push gestures shown in FIG. 5.

FIG. 6 is an example of a digit user interface 600 which may be controlled by the push gestures shown in FIG. 5. The digit user interface 600 may be presented on the display 202 in such a way as to allow the user 104 to enter numerical digit values into the television 102 using the push gestures. In the exemplary digit user interface 600 provided in FIG. 6, the available digits are presented to the user as a virtual keypad which may be accessed using the push gestures. The virtual keypad includes buttons for the digits 0-9 as shown. The push gestures associated with gesture identifiers 502 having values of "1" through "10" may be mapped to these virtual buttons so that the user 104 may input digit values by providing the appropriate push gestures within the operating range of the gesture input device(s) 104. In this particular example, the push gesture associated with the gesture identifier 502 having a value of "0" is not included in the digit user interface 600 because it does not include any push gestures to be read by the system.

Figure 7:
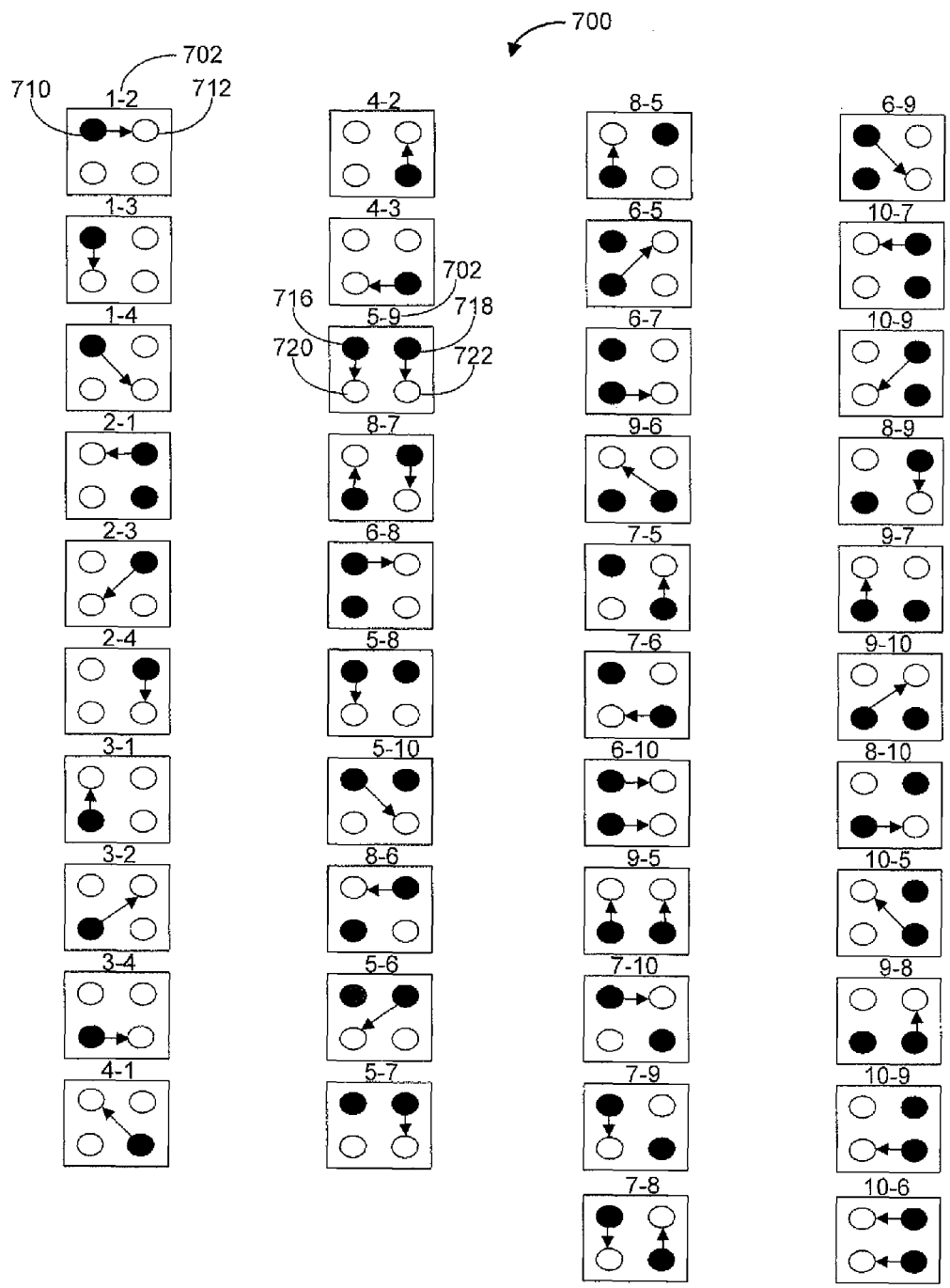
FIG. 7 is an example of move gestures which may be used to input information into a drag user interface.

As discussed briefly above, move gestures may also be provided to allow users 104 more granular control of the television 102 (or other media device). FIG. 7 provides an illustration of quadrant-based move gestures 700 which may be used to input information into a drag user interface. A drag user interface is a user interface which provides buttons similar to the button user interface, but allows the user to "drag" items in the user interface from one quadrant to another. As noted above, a move gesture refers to a gesture in which the user moves his hands from one quadrant (e.g., 402(a)) to another quadrant (e.g., 402(c)).

The quadrant-based gestures shown in FIG. 7 may be expressed as the gesture identifier 502 associated with the starting position of the hands 106 of the user 104, followed by the gesture identifier 502 associated with the finishing position of the hands 106 of the user. For example, the move gesture labeled as "1-2" is a move gesture in which the hands 106 of the user 104 are initially positioned to provide the push gesture associated with gesture identifier having a value of "1" by pushing the upper-left quadrant as indicated by the darkened circle 710 shown in the figure. The move gesture is completed by the user 104 moving the hand 106 to the push gesture associated with the gesture identifier having a value of "2", as indicated by the arrow pointing to the darkened circle 712. As a result, the gesture identifier 702 associated with this move gesture is "1-2" to indicate the movement involved. It should be appreciated that the specific naming conventions for gesture identifiers 702 are merely one possible implementation, and that other naming conventions may be used to identify specific move gestures 700 within the system.

Some move gestures may involve movement of both of the hands 106 of the user 104. For example the move gesture having a gesture identifier 702 of "5-9" involve movement of both hands 106 of the user 104. This particular move gesture starts with a push gesture associated with the gesture identifier having a value of "5", in which both the upper left 716 and upper right 718 quadrants are pushed by the user. The user then moves both hands to the "9" position, in which both of the lower left 720 and lower right 722 quadrants are pushed by the user 104. Thus, as is apparent from FIG. 7, a large number of different move gestures are possible, which provides considerable more control and options to the user than the limited number of gestures provided by simply pushing quadrants.

Figure 8:
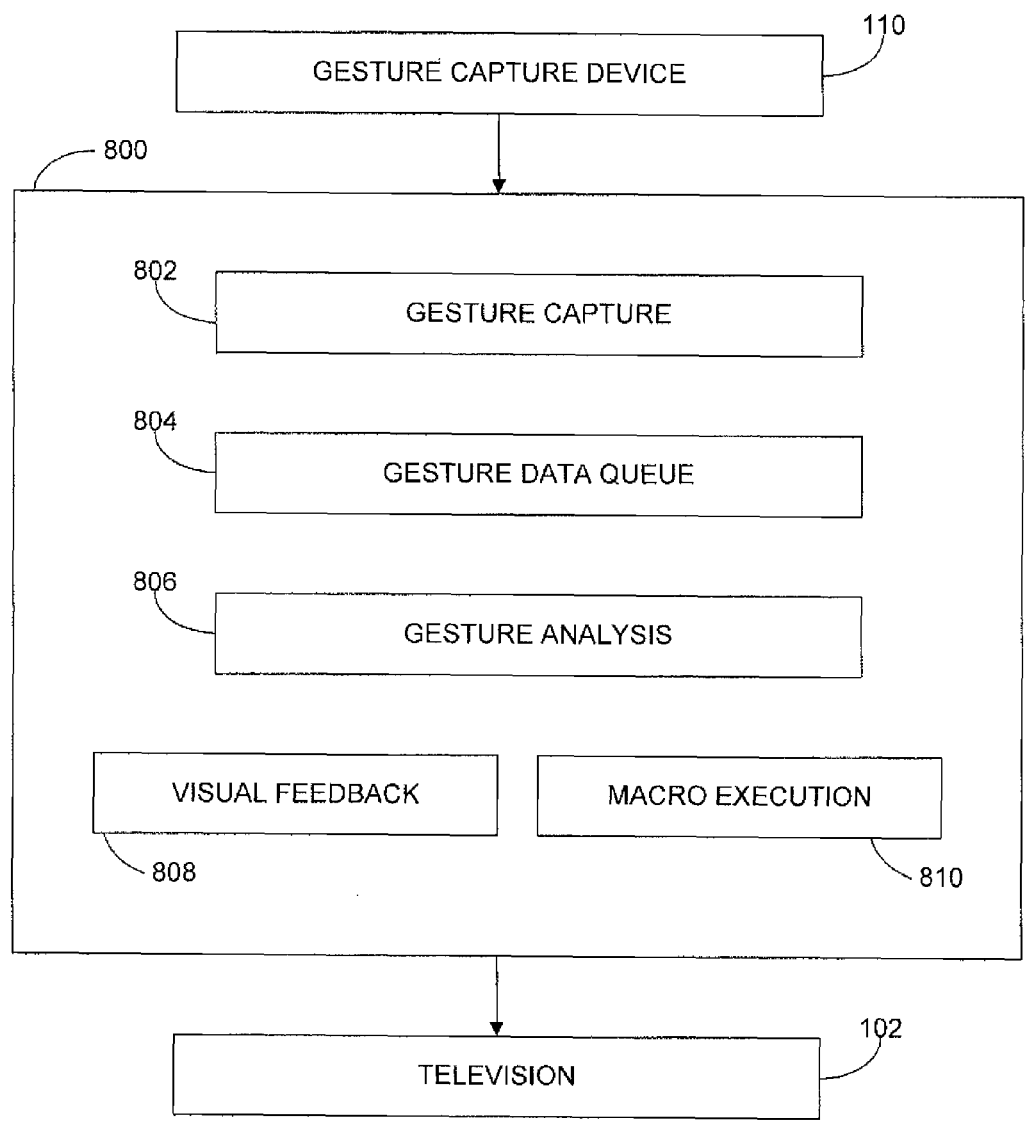
FIG. 8 is a more detailed view of the system components forming the interface between the gesture-capture device and the television.

The move gestures and push gestures described above may be processed by the television (or other media display device) to provide remote control of the device 102 to the user 106. FIG. 8 is a more detailed view of system components forming a user interaction interface 800 between the gesture-capture device 110 which receives the inputted gestures from the user 104 and the television 102. The components provided in the interface 800 may be software modules stored in memory 210, or they may be hardware-based solutions, or some combination of hardware and software.

The interface 800 may include a gesture capture module 802. The gesture capture module 802 receives raw data from the gesture capture device 110 and converts the data into bit sequences which are described in detail below. In some embodiments, the gesture capture module 802 takes the form of computer executable instructions stored in the memory 210 which are executed by the processor 206. The interface 800 may further include a gesture data queue 804. The gesture data queue 804 typically takes the form of a memory (such as memory 210, for example) which stores the bit sequences generated by the gesture capture module 802. The gesture data queue 804 holds the bit sequences and passes them to the gesture analysis module 806. Typically, the data queue is a first-in-first-out (FIFO) data queue which passes the bit sequences to the gesture analysis module in the order in which they are received from the gesture capture module 802. The gesture analysis module 806 generally receives the bit sequences from the data queue 804 and analyzes the bit sequences to determine which gestures have been input by the user 104. The interface 800 also may include a feedback module 808 which is configured to generate feedback to the user. In some embodiments, the feedback is generated on the display 202 of the television 102. The interface 800 may further include a macro execution module 810 which executes commands which control the operation of the television 102.

Figure 9A:
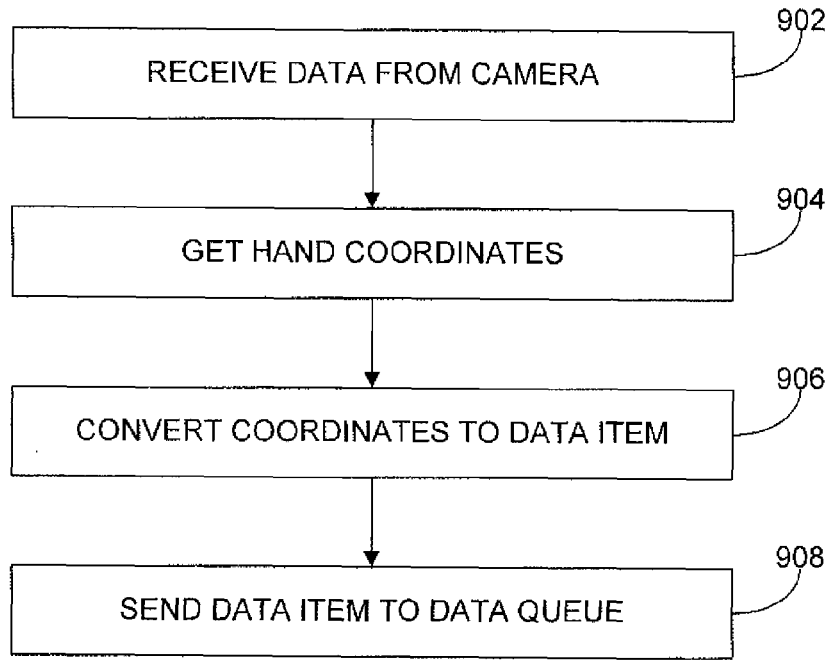
FIG. 9 is a flowchart of a gesture capture process performed by a media device in accordance with one or more embodiments.
Figure 9B:
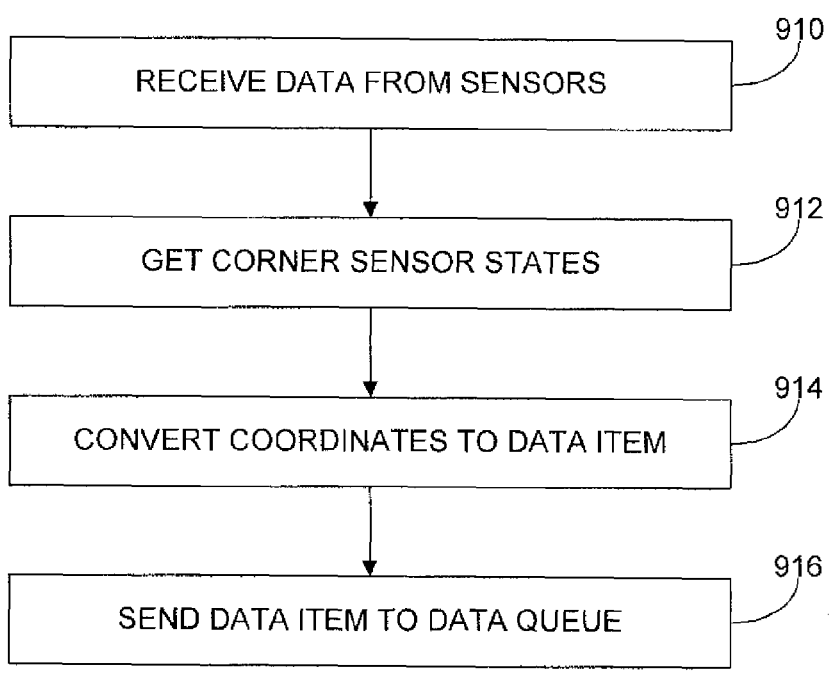

As discussed in connection with FIGS. 3A and 3B, the gesture capture device 204 may take various forms, including a camera-based implementation and a sensor-based implementation. FIGS. 9A and 9B are flowcharts of exemplary gesture capture processes that may be performed by the gesture capture module 802 of FIG. 8. The flowchart in FIG. 9A provides an example of gesture capture using a camera-based implementation such as that described in FIG. 3A. The process begins at block 902, where the gesture capture module 802 receives raw data from the camera 302 (typically mounted somewhere on the television). The process then moves to block 904, where the gesture capture module 802 determines the coordinates of the hands 106 of the user 104. For example, the gesture capture module 802 may be configured to detect the shape of hands in the raw image data, and then determine the quadrant 402 in which the hands are located.

The process then moves to block 906, where the determined coordinates are converted into data items. In some embodiments, the data item may be a 4-bit data item which may be represented as a quadruple (x1, x2, x3, x4). Each bit x1, x2, x3, and/or x4 may be set as either 0 or 1, and is typically associated with one of the quadrants 402. When the bit is set to a value of 1, it means that the quadrant associated with the bit has been pushed by the hand 106 of the user 104. When the bit is set to a value of 0, it means that the quadrant is not pushed. Once raw image data from the camera 302 has been converted to a data item, the data item is then sent to the gesture data queue 804 at block 908 for storage therein.

FIG. 9B is a flowchart of a gesture capture process which uses sensor 304 to detect hand gestures from a user 106. The process begins at block 910 where the gesture capture module 802 receives data from the sensors 304. As discussed above in connection with FIG. 3B, the sensors 304 may include four sensors placed at or near the four corners of the display 202 of the television 102. The sensors generate signals which allow the gesture capture module to determine which corners have been pushed by the user 106. Next, the process moves to block 912, where the gesture capture module 802 is 106. Next, the process moves to block 912, where the gesture capture module 802 is configured to determine the corner sensor states. At block 914 the corner sensor states may be converted into data items in a manner similar to that described above in the connection with block 906 of FIG. 9. As with the camera-based implementation, the data item may be a four bit data item. Once the data item has been generated, it may be sent to the gesture data queue 804 to be stored at block 916.

Typically, the processes described in FIGS. 9A and 9B are repeated at a high rate of speed (e.g., 10 times per second) so that the gesture capture module sends a substantially continuous sequence of 4-bit quadruples to the data queue 804. This quadruple is stored in the data queue 804 until it the gesture analysis module 806 dequeues each quadruple for analysis. As discussed above, the user interface of the television 102 may operate in various user interface modes to provide different types of functionality to the user 104. These modes include a button interface mode in which the display 202 of the television 102 is divided into four virtual buttons (associated with each of the four quadrants 402(*a*)-402(*d*) of the display 202) that may be accessed by the user through push gestures 500 with gesture identifiers 502 having values of "1" through "4" as shown in FIG. 5. The user interface may also operate in a digit mode, in which the television display provides a virtual keypad that allows users to enter digit values using push gestures 500. The television user interface may further operate in a drag user interface mode which allows the user access to a more complex set of commands utilizing the move gestures described above in connection with FIG. 7.

In some embodiments, the gesture identifiers may be associated with macro commands. The macro commands may be programmed into the television to cause the television to perform specific functions when the commands are called— much in the same way as conventional remote control devices. In some embodiments, each of the user interfaces provided by the gesture control system may utilize a lookup table to associate the gesture identifiers with specific macros defined to control various aspects of the television's functionality. Examples of lookup tables for each of the user interface modes are provided below:

TABLE 1

DIGIT USER INTERFACE

| PUSH GESTURE ID | MACRO ID |
|---|---|
| 0 | −1 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 0 |

TABLE 2

BUTTON USER INTERFACE

| PUSH GESTURE ID | MACRO ID |
|---|---|
| 0 | −1 |
| 1 | 10 |
| 2 | 11 |
| 3 | 12 |
| 4 | 13 |
| 5 | 14 |
| 6 | 15 |
| 7 | 16 |
| 8 | 17 |
| 9 | 18 |
| 10 | 19 |

TABLE 3

DRAG USER INTERFACE

| MOVE GESTURE ID | MACRO ID |
|---|---|
| 1-2 | 20 |
| 1-3 | 21 |
| 1-4 | 22 |
| 2-1 | 23 |
| 2-3 | 24 |
| 2-4 | 25 |
| 3-1 | 26 |
| 3-2 | 27 |
| 3-4 | 28 |
| 4-1 | 29 |
| 4-2 | 30 |
| 4-3 | 31 |
| 5-9 | 32 |
| 8-7 | 33 |
| 6-8 | 34 |
| 5-8 | 35 |
| 5-10 | 36 |
| 8-6 | 37 |
| 5-6 | 38 |
| 5-7 | 39 |
| 8-5 | 40 |
| 6-5 | 41 |
| 6-7 | 42 |
| 9-6 | 43 |
| 7-5 | 44 |
| 7-6 | 45 |
| 6-10 | 46 |
| 9-5 | 47 |
| 7-10 | 48 |
| 7-9 | 49 |
| 6-9 | 50 |
| 10-7 | 51 |
| 10-9 | 52 |
| 8-9 | 53 |
| 9-7 | 54 |

TABLE 3-continued

DRAG USER INTERFACE

| MOVE GESTURE ID | MACRO ID |
|---|---|
| 9-10 | 55 |
| 8-10 | 56 |
| 10-5 | 57 |
| 9-8 | 58 |
| 10-9 | 59 |
| 7-8 | 60 |
| 10-6 | 61 |

Figure 10:
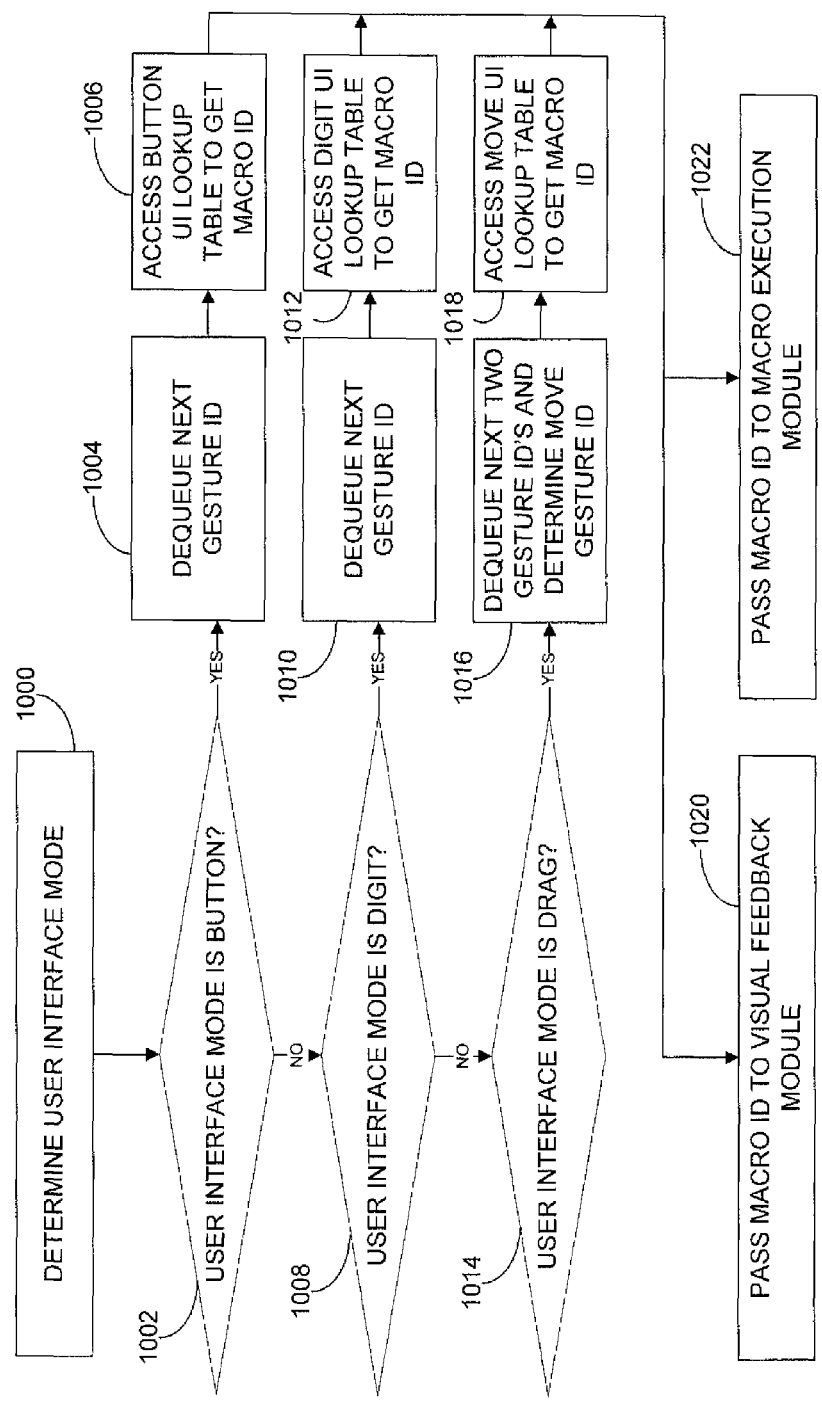
FIG. 10 is a flowchart of a gesture analysis process in accordance with one or more embodiments.

Referring now to FIG. 10, a flowchart of an exemplary gesture analysis process performed by the gesture analysis module 806 is provided. The gesture analysis module 806 begins the gesture analysis process at block 1000, where it determines the current user interface mode 1000. Determination of the current user interface mode allows the gesture analysis module to properly dequeue data from the data queue 808 as shown below. After determining the user interface mode, the process moves to decision block 1002, where it is determined if the user interface mode is in the button user interface mode. If the user interface mode is not the button mode, the process moves to decision block 1008 where gesture analysis module 806 determines whether the user interface is operating in the digit mode. If not, the process moves to decision block 1014, where the gesture analysis module 806 determines if the user interface is operating in drag mode. If not, the process returns to block 1000 and begins anew.

If, however, at decision block 1002, the user interface is in the button mode, the process moves to block 1004, where the next gesture identifier stored in the data queue 808 is retrieved from the data queue. At block 1006, the button user interface lookup table (such as, for example, Table 1 above) is accessed to determine which macro identifier to call within the television 102. After retrieving the macro identifier, the process moves to blocks 1020 and 1022, respectively. At block 1020, the macro identifier is passed to the feedback module 808. Similarly, at block 1022, the macro identifier is passed to the macro execution module 1022 in the television 102.

Referring back to decision block 1008, if the user interface is set to the digit mode, the process moves to block 1010, where the next gesture identifier is retrieved from the data queue 804. Next, the process moves to block 1012, where the digit user interface lookup table (Table 2) is accessed to lookup the macro identifier associated with the gesture identifier input into the digit user interface. Once the correct macro identifier has been determined, it is sent to the feedback module 808 at block 1020 and to the macro execution module 810 at block 1022.

Referring back to decision block 1014, if the user interface is in the drag mode, the process moves to block 1016. Because the drag mode utilizes move gestures (such as those described in connection with FIG. 7 above), two different push gestures are included in each move gesture. As a result, the next two gesture identifiers are retrieved from the data queue 804 to determine which move gesture identifier has been input into the television 102 by the user 104. Next, at block 1018, the move gesture identifier is compared against the drag user interface lookup table (Table 3 above) to determine which macro to call. Next, the process again moves to blocks 1020 and 1022 where the macro identifier is passed to the feedback module 808 and macro execution module 810, respectively.

As discussed previously, the feedback module 808 generates feedback to the user 104 based on the inputted gestures. Based on each four bit data item generated by the gesture analysis module 806, the feedback module determines the state of each of the four quadrants 402 and provides an indication to the user 106 of their current state. For those bits that are set as 1, the corresponding quadrant is considered enabled. Conversely, those bits that are set as 0 are considered to be disabled. In some embodiments, eleven basic states may be represented by the feedback module 808 according to the exemplary scheme shown in Table 4:

TABLE 4

TL = Top Left Quadrant; TR = Top Right Quadrant; BL = Bottom Left Quadrant; BR = Bottom Right Quadrant

| Basic State No. S | 4 Bit Data Item (x1, x2, x3, x4) | Feedback State |
|---|---|---|
| 1 | (0, 0, 0, 0) | None enabled (Reset State) |
| 2 | (1, 0, 0, 0) | TL Enabled |
| 3 | (0, 1, 0, 0) | TR Enabled |
| 4 | (0, 0, 1, 0) | BL Enabled |
| 5 | (0, 0, 0, 1) | BR Enabled |
| 6 | (1, 1, 0, 0) | TL and TR Enabled |
| 7 | (1, 0, 1, 0) | TL and BL Enabled |
| 8 | (1, 0, 0, 1) | TL and BR Enabled |
| 9 | (0, 1, 1, 0) | TR and BL Enabled |
| 10 | (0, 1, 0, 1) | TR and BR Enabled |
| 11 | (0, 0, 1, 1) | BL and BR Enabled |

As briefly noted above, the television 102 may include additional devices to provide feedback to the user. The feedback allows the user to confirm that the system is reading the gestures they have input as intended. In one embodiment, the television 102 may include visual feedback devices on each corner of the display 202 which provide details to the user 106 about the current state of the television control. Typically, these feedback devices are small indicator lights such as light-emitting diodes (LEDs) which are configured to flash one or more colors based on the state of the corner of the display 202 (and its associated quadrant 402) at which they are located. In one embodiment, the LEDs may be configured to provide information about three different states: enabled, disabled, and hint. The LEDs may use three different colors to represent each of the three states. For example, red may indicate that the state of the quadrant 402 is enabled, while a dark may indicate that the quadrant 402 is disabled. Hints may be provided to the user, indicated by green, which tell the user that the quadrant associated with the hint is an available option for the next push gesture. The state information may be provided without the use of light indicators on the exterior of the screen, and instead may be provided via color information (such as background shading, for example) provided within the display 202 of the television 102. The indicators provided within the display may take the form of colored icons (or some other visual indicator as well.

Figure 11:
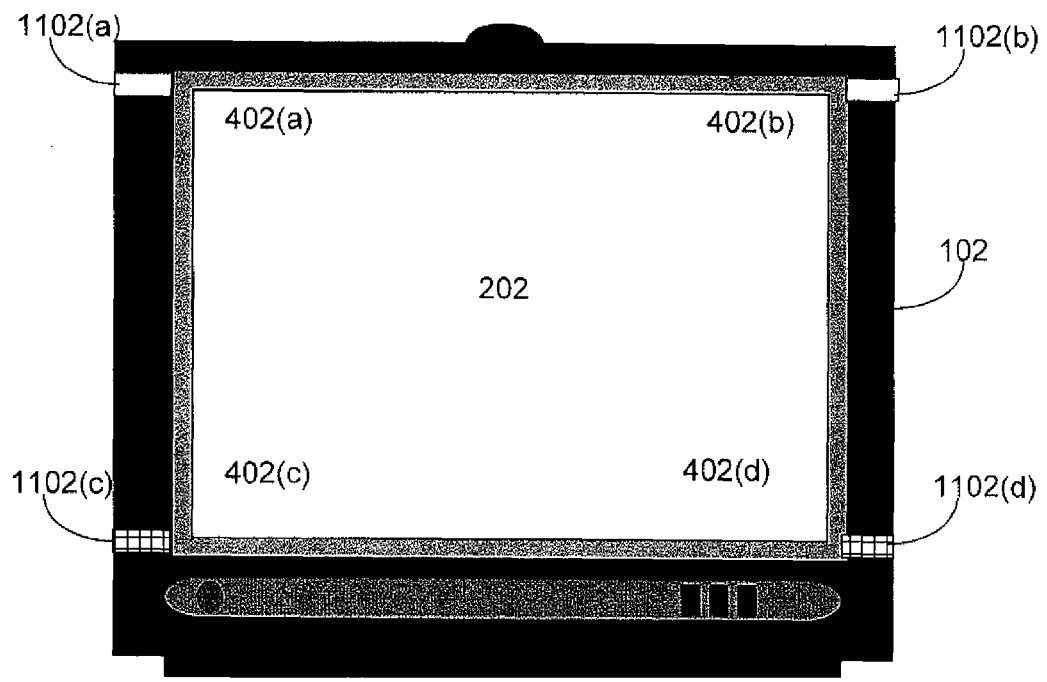
FIG. 11 is an example of how visual feedback may appear on a television.

FIG. 11 provides an example of how the visual feedback may appear on the television 102 according to one embodiment. In the example provided in FIG. 11, the user 106 has pushed the bottom left quadrant 402(c) and the bottom right quadrant 402(d). Thus, the top left and top right quadrants 402(a) and 402(b) are disabled, while the bottom left and bottom right quadrants 402(c) and 402(d), respectively, are enabled. Red LEDs 1102(c) and 1102(d) positioned near the bottom left quadrant and bottom right quadrants are illuminated. The LEDs 1102(a) and 1102(b) positioned next to top left quadrant 402(a) and top right quadrant 402(b) are not illuminated (e.g. dark).

It will be understood by those of skill in the art that numerous and various modifications can be made without departing from the spirit of the present invention. Therefore, it should be clearly understood that the forms of the invention are illustrative only and are not intended to limit the scope of the invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. A method of providing user control of a media device, the method comprising:
    receiving a gesture input directed toward at least one of four predefined areas related to the device;
    generating data indicative of the gesture utilizing a device processor, wherein the data indicative of the gesture includes a gesture identifier and an at least four-bit data item wherein each bit is associated with one of the predefined areas;
    generating a plurality of the at least four-bit data items based on a plurality of received gesture inputs;
    retrieving two of the at least four-bit data items from the plurality of the at least four-bit data items from a data queue storing the plurality of the at least four-bit data items in a device memory when the media device is in a drag user interface mode;
    combining the two retrieved at least four-bit data items into a move gesture; and
    controlling the media device based at least in part on the generated data indicative of the gesture.

2. The method of claim 1, wherein the predefined areas comprise quadrants of a display on the device.

3. The method of claim 2, wherein the gesture input is a push gesture input received from hands of a user of the device.

4. The method of claim 1, wherein the gesture input is received via at least one of a camera on the device or motion sensors on the device.

5. The method of claim 4, wherein the motion sensors are positioned to detect motion directed at the quadrants of the display.

6. The method of claim 1, further comprising determining a macro identifier associated with the gesture identifier.

7. The method of claim 6, wherein controlling the media device comprises executing a macro based on the macro identifier.

8. A media device having machine-executable instructions stored thereon, which when executed by a processor, perform a method of providing user control of the media device, the method comprising:
    receiving a gesture input directed toward at least one of four predefined areas related to the device;
    generating data indicative of the gesture utilizing a device processor, wherein the data indicative of the gesture includes a gesture identifier and an at least four-bit data item wherein each bit is associated with one of the predefined areas;
    generating a plurality of the at least four-bit data items based on a plurality of received gesture inputs;
    retrieving two of the at least four-bit data items from the plurality of the at least four-bit data items from a data queue storing the plurality of the at least four-bit data items in a device memory when the media device is in a drag user interface mode;
    combining the two retrieved at least four-bit data items into a move gesture; and
    controlling the media device based at least in part on the generated data indicative of the gesture.

9. The media device of claim 8, wherein the media device is a television.

10. The media device of claim 8, wherein the predefined areas comprise quadrants of a display on the device.

11. The media device of claim 10, wherein the gesture input is a push gesture input received from hands of a user of the device.

12. The media device of claim 11, wherein the generated data comprises a gesture identifier associated with the push gesture input from the hands of the user of the device.

13. The media device of claim 8, wherein the gesture input is received via at least one of a camera on the device or motion sensors on the device.

14. The media device of claim 13, wherein the motion sensors are positioned to detect motion directed at the quadrants of the display.

15. The media device of claim 8, further comprising determining a macro identifier associated with the gesture identifier.

16. The media device of claim 15, wherein controlling the media device comprises executing a macro based on the macro identifier.

17. A television set comprising:
    a processor;
    a controller;
    a memory;
    a gesture capture device configured to receive a gesture input directed to at least one of four predefined areas related to the television set;
    a gesture capture module; and
    a user interaction interface configured to:
    generate data indicative of the gesture input directed toward the at least one of the four predefined areas wherein the data indicative of the gesture includes a gesture identifier and an at least four-bit data item wherein each bit is associated with one of the predefined areas;
    generate a plurality of the at least four-bit data items based on a plurality of received gesture inputs;
    retrieve two of the at least four-bit data items from the plurality of the at least four-bit data items from a data queue storing the plurality of the at least four-bit data items when the television set is in a drag user interface mode;
    combine the two retrieved at least four-bit data items into a move gesture; and
    control the television based at least in part on the generated data.

18. The television set of claim 17, wherein the gesture capture device comprises at least one of a motion sensor or a camera device.

19. The television set of claim 18, wherein the predefined areas comprise quadrants of a display on the television.

20. A method of providing user control of a media device, the method comprising:
    receiving a gesture input directed toward at least one of four predefined areas related to the device;
    generating data indicative of the gesture utilizing a device processor, wherein the data indicative of the gesture includes a gesture identifier and an at least four-bit data item wherein each bit is associated with one of the predefined areas;
    generating a plurality of the at least four-bit data items based on a plurality of received gesture inputs;
    retrieving one of the at least four-bit data items from the plurality of the at least four-bit data items from a data queue storing the plurality of the at least four-bit data items in a device memory when the media device is in one of a digit interface mode or a button user interface mode; and controlling the media device based at least in part on the generated data indicative of the gesture.

21. The method of claim 20, wherein the predefined areas comprise quadrants of a display on the device.

22. The method of claim 21, wherein the gesture input is a push gesture input received from hands of a user of the device.

23. The method of claim 20, wherein the gesture input is received via at least one of a camera on the device or motion sensors on the device.

24. The method of claim 23, wherein the motion sensors are positioned to detect motion directed at the quadrants of the display.

25. The method of claim 20, further comprising determining a macro identifier associated with the gesture identifier.

26. The method of claim 25, wherein controlling the media device comprises executing a macro based on the macro identifier.

27. The method of claim 20, wherein the plurality of predefined areas comprises four predefined areas.

28. A media device having machine-executable instructions stored thereon, which when executed by a processor, perform a method of providing user control of the media device, the method comprising:

receiving a gesture input directed toward at least one of four predefined areas related to the device;

generating data indicative of the gesture utilizing a device processor, wherein the data indicative of the gesture includes a gesture identifier and an at least four-bit data item wherein each bit is associated with one of the predefined areas;

generating a plurality of the at least four-bit data items based on a plurality of received gesture inputs;

retrieving one of the at least four-bit data items from the plurality of the at least four-bit data items from a data queue storing the plurality of the at least four-bit data items in a device memory when the media device is in one of a digit interface mode or a button user interface mode; and controlling the media device based at least in part on the generated data indicative of the gesture.

29. The media device of claim 28, wherein the predefined areas comprise quadrants of a display on the device.

30. The media device of claim 28, wherein the gesture input is a push gesture input received from hands of a user of the device.

31. The media device of claim 28, wherein the gesture input is received via at least one of a camera on the device or motion sensors on the device.

32. The media device of claim 31, wherein the motion sensors are positioned to detect motion directed at the quadrants of the display.

33. The media device of claim 28, further comprising determining a macro identifier associated with the gesture identifier.

34. The media device of claim 33, wherein controlling the media device comprises executing a macro based on the macro identifier.

35. The media device of claim 28, wherein the plurality of predefined areas comprises four predefined areas.

36. A television set comprising:

a processor;

a controller;

a memory;

a gesture capture device configured to receive a gesture input directed to at least one of four predefined areas related to the television set;

a gesture capture module; and a user interaction interface configured to:

generate data indicative of the gesture input directed toward the at least one of the four predefined areas wherein the data indicative of the gesture includes a gesture identifier and an at least four-bit data item wherein each bit is associated with one of the predefined areas;

generate a plurality of the at least four-bit data items based on a plurality of received gesture inputs;

retrieve one of the at least four-bit data items from the plurality of the at least four-bit data items from a data queue storing the plurality of the at least four-bit data items in a device memory when the media device is in one of a digit interface mode or a button user interface mode; and control the television based at least in part on the generated data.

37. The television set of claim 36, wherein the gesture capture device comprises at least one of a motion sensor or a camera device.

38. The television set of claim 36, wherein the predefined areas comprise quadrants of a display on the television.

* * * * *